United States Patent
Lertkultanon et al.

(10) Patent No.: US 12,390,923 B2
(45) Date of Patent: Aug. 19, 2025

(54) ROBOTIC GRIPPER ASSEMBLIES FOR OPENABLE OBJECT(S) AND METHODS FOR PICKING OBJECTS

(71) Applicant: MUJIN, Inc., Tokyo (JP)

(72) Inventors: Puttichai Lertkultanon, Tokyo (JP); Hironori Mizoguchi, Tokyo (JP); Yoshiki Kanemoto, Tokyo (JP); Rosen Nikolaev Diankov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 257 days.

(21) Appl. No.: 17/902,694

(22) Filed: Sep. 2, 2022

(65) Prior Publication Data

US 2023/0070495 A1    Mar. 9, 2023

Related U.S. Application Data

(60) Provisional application No. 63/241,460, filed on Sep. 7, 2021.

(51) Int. Cl.
*B25J 9/16* (2006.01)
*B65G 47/90* (2006.01)

(52) U.S. Cl.
CPC .......... *B25J 9/1612* (2013.01); *B25J 9/1653* (2013.01); *B25J 9/1664* (2013.01); *B25J 9/1679* (2013.01); *B25J 9/1697* (2013.01); *B65G 47/905* (2013.01)

(58) Field of Classification Search
CPC ...... B25J 9/1612; B25J 9/1653; B25J 9/1664; B25J 9/1679; B25J 9/1697; B25J 9/161; B25J 9/1656; B25J 15/0616; B25J 9/1628; B25J 9/163; B25J 9/1669; B25J 15/0683; B25J 15/065; B65G 47/905; B65G 47/917; B65G 47/918; G05B 2219/40006; G05B 2219/39558; G05B 2219/39555
See application file for complete search history.

(56) References Cited

U.S. PATENT DOCUMENTS

| | | | |
|---|---|---|---|
| 2007/0280812 A1 | 12/2007 | Morency et al. | |
| 2014/0025198 A1* | 1/2014 | Mattern | B25J 9/1697 700/228 |
| 2019/0228371 A1 | 7/2019 | Murphy et al. | |

(Continued)

FOREIGN PATENT DOCUMENTS

| | | |
|---|---|---|
| CN | 113021401 A | 6/2021 |
| JP | 05114799 A | 5/1993 |

(Continued)

OTHER PUBLICATIONS

Decision to Grant mailed Mar. 30, 2023 for Japanese patent application No. 2022141265, Applicant: Mujin, Inc.

(Continued)

*Primary Examiner* — Abby Y Lin
*Assistant Examiner* — Esvinder Singh
(74) *Attorney, Agent, or Firm* — Dorsey & Whitney LLP

(57) ABSTRACT

A system and method for operating a transfer robot to grasp and transfer objects is disclosed. The transport robot includes a robotic gripper assembly having an array of addressable vacuum regions each configured to independently provide a vacuum to grasp a target object. The gripper assembly can be configured and/or operated according to one or more physical characteristics of targeted objects and/or corresponding scenarios.

18 Claims, 9 Drawing Sheets

(56) References Cited

U.S. PATENT DOCUMENTS

| | | | |
|---|---|---|---|
| 2019/0367275 A1* | 12/2019 | Hoffman | B65G 1/1373 |
| 2020/0206952 A1* | 7/2020 | Wagner | B25J 15/10 |
| 2021/0170597 A1* | 6/2021 | Choi | B25J 15/10 |
| 2021/0221002 A1 | 7/2021 | Bader et al. | |
| 2021/0316449 A1* | 10/2021 | Wang | B25J 9/1664 |
| 2022/0134559 A1* | 5/2022 | Li | B25J 9/1612 |
| | | | 700/255 |
| 2022/0152845 A1* | 5/2022 | Allen | B25J 15/0408 |
| 2022/0383538 A1* | 12/2022 | Tang | G06T 7/73 |
| 2024/0308081 A1* | 9/2024 | Ando | B25J 9/1697 |

FOREIGN PATENT DOCUMENTS

| | | |
|---|---|---|
| JP | 2000255965 A | 9/2000 |
| JP | 2018012176 A | 1/2018 |
| JP | 2018103317 A | 7/2018 |
| JP | 2019188600 A | 10/2019 |
| JP | 2020192648 A | 12/2020 |
| JP | 2021030431 A | 3/2021 |
| WO | 2016142981 A1 | 9/2016 |
| WO | 2020092452 A1 | 5/2020 |
| WO | 2021035062 A1 | 2/2021 |

OTHER PUBLICATIONS

Office Action mailed Dec. 27, 2022 for Japanese patent application No. 2022141265, Applicant: Mujin, Inc.
Office Action mailed Feb. 10, 2023 for Japanese patent application No. 2022141265, Applicant: Mujin, Inc.

* cited by examiner

ROBOTIC GRIPPER ASSEMBLIES FOR OPENABLE OBJECT(S) AND METHODS FOR PICKING OBJECTS

RELATED APPLICATION

This application is related to U.S. Patent Application No. 63/241,460, filed Sep. 7, 2021, entitled ROBOTIC GRIPPER ASSEMBLIES FOR OPENABLE OBJECT(S) AND METHODS FOR PICKING OBJECTS, which is incorporated herein by reference in its entirety.

TECHNICAL FIELD

The present technology is directed generally to robotic systems and, more specifically, robotic gripper assemblies configured to selectively grip and hold openable objects.

BACKGROUND

Robots (e.g., machines configured to automatically/autonomously execute physical actions) are now extensively used in many fields. Robots, for example, can be used to execute various tasks (e.g., manipulate or transfer an object) in manufacturing, packaging, transport and/or shipping, etc. In executing the tasks, robots can replicate human actions, thereby replacing or reducing human involvements that are otherwise required to perform dangerous or repetitive tasks. Robots often lack the sophistication necessary to duplicate human sensitivity and/or adaptability required for executing more complex tasks. For example, robots often have difficulty selectively gripping object(s) from a group of objects with immediately neighboring objects, as well as irregular shaped/sized objects, etc. Also, robots are often limited to grasping objects using force applied along one predetermined direction. Accordingly, there remains a need for improved robotic systems and techniques for controlling and managing various aspects of the robots.

DETAILED DESCRIPTION

Figure 1:
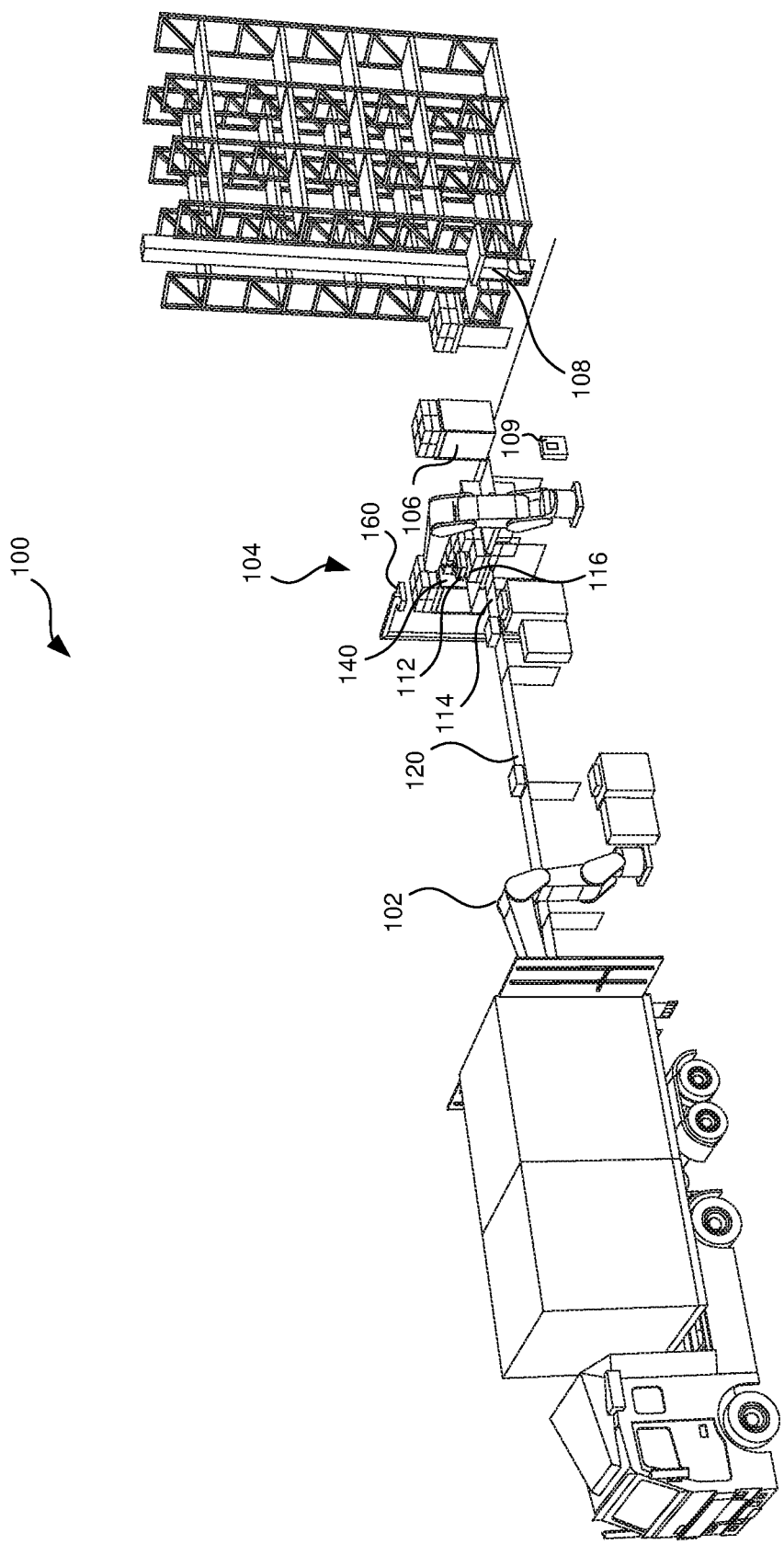
FIG. 1 illustrates an example environment in which a robotic system transports objects in accordance with one or more embodiments of the present technology.

Systems and methods for gripping selected or targeted objects are described herein. The systems can include a transfer robot with gripper assemblies configured to be operated independently or in conjunction to grip/release a targeted set of one or more objects having lids that are fixed or openable/removable, such as boxes with removable lids. The systems can pick up multiple objects at the same time or sequentially. The system can select objects to be carried based upon, for example, the carrying capability of the gripper assembly, a motion plan, or combinations thereof. The gripper assembly can reliably grip objects from a group of adjacently placed or abutting objects, a set of irregular objects, a group of objects having unique shapes/sizes, etc. For example, the gripper assemblies can include addressable vacuum regions or banks each configured to draw in air such that selected objects are held via a vacuum grip. The gripper assembly can be robotically moved to transfer the grasped objects to a desired location and then release the objects. The system can also release grasped objects at the simultaneously or sequentially. This process can be repeated to transport any number of objects between different locations. Accordingly, the systems can derive access sequences, drop/release poses, and/or motion plans for transferring the one or more objects.

In some embodiments, the gripper assembly can include one or more support or peripheral vacuum regions surrounding a central vacuum region. Each vacuum region can correspond to a set of one or more interface mechanisms (e.g., suction cups) configured to grip a target object. For example, the suction cups can protrude from an interface surface (e.g., a bottom portion) of the gripper assembly and can be independently engaged according to the target object and/or other environmental conditions. The gripper assembly may further include a stabilizer bracket arranged and/or operable to contact the grasped object and provide support that further complements the gripping force.

The gripper assembly can be configured and/or operated according to one or more physical characteristics of targeted objects and/or corresponding scenarios (e.g., source packing configurations). For illustrative purposes, various embodiments of the gripper assembly and the corresponding operating method are described below using manipulation of openable boxes or boxes having lids, such as for shoe boxes. However, it is understood that the gripper assembly and the corresponding operations may be applicable to other objects that have fixed, removable, or movable lids (e.g., removably coupled lids, unfastened lids, hinged covers, flap, or the like).

At least some embodiments are directed to a method for operating a transport robot having a gripper assembly with addressable pick-up regions. The pick-up regions can be configured to independently provide vacuum gripping and/or independently extendable/retractable along at least one direction. Target object(s) are identified based on captured image data or scanning a code on the object. The pick-up regions can draw in air to grip the identified target object(s).

In some embodiments, a transport robot to robotically move the gripper assembly, which is carrying the identified target objects.

In some embodiments, a robotic transport system includes a robotic apparatus, a target object detector, and a vacuum gripper device. The vacuum gripper device includes a plurality of addressable regions and a manifold assembly. The manifold assembly can be fluidically coupled to each of the addressable regions and to at least one vacuum line such that each addressable region is capable of independently providing a negative pressure via an array of suction elements. The negative pressure can be sufficient to hold at least one target object against the vacuum gripper device while the robotic apparatus moves the vacuum gripper device between different locations.

A method for operating a transport robot includes receiving image data representative of a group of objects (e.g., a stack or pile of objects, or a container of objects). One or more target objects are identified in the group based on the received image data. Addressable vacuum regions are selected based on the identified one or more target objects. The addressable vacuum regions can be selected based on identified dimensions of the objects, surface images of the objects, outline shapes of the objects, and/or the like. The transport robot is in command to cause the selected vacuum regions to hold and transport the identified one or more target objects. The transport robot includes a gripper assembly having an array of vacuum regions (or grippers) each configured to independently provide vacuum gripping and each vacuum gripper is configured to independently extend from the gripper assembly. A vision sensor device can capture the image data, which is representative of the target objects adjacent to or held by the vacuum gripper device.

In the following, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium, including a tangible, non-transient computer-readable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Suitable Environments

FIG. 1 is an illustration of an example environment in which a robotic system 100 transports objects. The robotic system 100 can include an unloading unit 102, a transfer unit or assembly 104 ("transfer assembly 104"), a transport unit 106, a loading unit 108, or a combination thereof in a warehouse or a distribution/shipping hub. Each of the units of the robotic system 100 can be configured to execute one or more tasks. The tasks can be combined in sequence to perform an operation that achieves a goal, such as to unload objects from a truck or a van for storage in a warehouse or to unload objects from storage locations and load them onto a truck or a van for shipping. In another example, the task can include moving objects from one container to another container. Each of the units can be configured to execute a sequence of actions (e.g., operating one or more components therein) to execute a task.

In some embodiments, the task can include manipulation (e.g., moving and/or reorienting) of a target object or package 112 (e.g., boxes, cases, cages, pallets, etc.) from a start location 114 to a task location 116. For example, the unloading unit 102 (e.g., a devanning robot) can be configured to transfer the target object 112 from a location in a carrier (e.g., a truck) to a location on a conveyor belt. The transfer assembly 104 (e.g., a palletizing/picking robot assembly) can be configured to load packages 112 onto the transport unit 106 or conveyor 120. In another example, the transfer assembly 104 can be configured to transfer one or more target packages 112 from one container to another container. The transfer assembly 104 can include a robotic end effector 140 ("end effector 140") with vacuum grippers (or vacuum regions) each individually operated to pick up and carry object(s) 112. When the end effector 140 is placed adjacent the one or more target objects 112, air can be drawn into the gripper(s), thereby creating a pressure differential sufficient for gripping and retaining the target objects. The target objects 112 can be picked up and transported without damaging or marring the object surfaces. The number of objects 112 carried at one time can be selected based upon stacking arrangements of objects at the pick-up location, available space at the release location (e.g., drop off location), transport paths between pick-up and release locations, optimization routines (e.g., routines for optimizing unit usage, robotic usage, etc.), combinations thereof, or the like. The end effector 140 can have one or more sensors configured to output readings indicating information about retained objects (e.g., number and configurations of retained objects), relative positions between any retained objects, or the like.

An imaging system 160 can provide image data used to monitor operation of components, identify target objects, track objects, or otherwise perform tasks. The image data can be analyzed to evaluate, for example, package stacking/packing arrangements (e.g., stacked packages, such as carboard boxes, packing containers, etc.), positional information of objects, available transport paths (e.g., transport paths between pickup zones and release zones), positional information about gripping assemblies, or combinations thereof. A controller 109 can communicate with the imaging system 160 and other components of the robotic system 100. The controller 109 can generate transport plans that include a sequence for picking up and releasing objects (e.g., illustrated as stable containers), positioning information, order information for picking up objects, order information for releasing objects, stacking plans (e.g., plans for stacking objects at the release zone), re-stacking plans (e.g., plans for re-stacking at least some of the containers at the pickup zone), or combinations thereof. The information and instructions provided by transport plans can be selected based on the arrangement of the containers, the contents of the containers, or combinations thereof. In some embodiments, the controller 109 can include electronic/electrical devices, such as one or more processing units, processors, storage devices (e.g., external or internal storage devices, memory, etc.), communication devices (e.g., communication devices for wireless or wired connections), and input-output devices (e.g., screens, touchscreen displays, keyboards, keypads, etc.). Example electronic/electrical devices and controller components are discussed in connection with FIG. 2.

The transport unit 106 can transfer the target object 112 (or multiple target object 112) from an area associated with the transfer assembly 104 to an area associated with the loading unit 108, and the loading unit 108 can transfer the target object 112 (by, e.g., moving the pallet carrying the target object 112) to a storage location. In some embodiments, the controller 109 can coordinate operation of the transfer assembly 104 and the transport unit 106 to efficiently load objects onto storage shelves.

The robotic system 100 can include other units, such as manipulators, service robots, modular robots, etc., not shown in FIG. 1. For example, in some embodiments, the robotic system 100 can include a de-palletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, another type of unit for manipulating (e.g., for sorting, grouping, and/or transferring) the objects differently according to one or more characteristics thereof, or a combination thereof. Components and subsystems of the system 100 can include different types of and effectors. For example, unloading unit 102, transport unit 106, loading unit 108, and other components of the robotic system 100 can also include robotic gripper assemblies. The configurations of the robotic gripper assemblies can be selected based on desired carrying capabilities. For illustrative purposes, the robotic system 100 is described in the context of a shipping center; however, it is understood that the robotic system 100 can be configured to execute tasks in other environments/purposes, such as for manufacturing, assembly, packaging, healthcare, and/or other types of automation.

Robotic Systems

Figure 2:
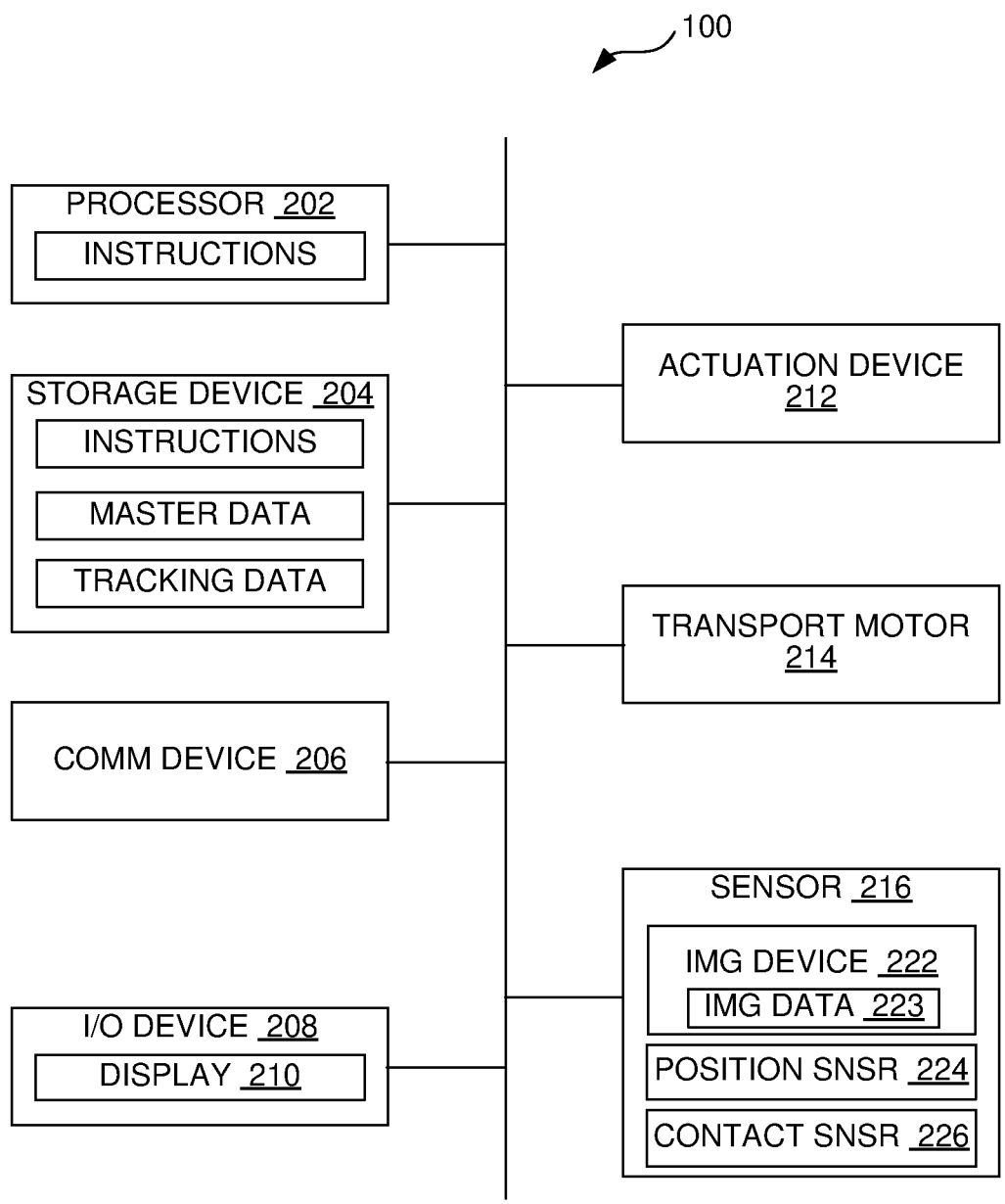
FIG. 2 is a block diagram illustrating the robotic system in accordance with one or more embodiments of the present technology.

FIG. 2 is a block diagram illustrating components of the robotic system 100 in accordance with one or more embodiments of the present technology. In some embodiments, for example, the robotic system 100 (e.g., at one or more of the units or assemblies and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, controllers, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, Zigbee, Z-wave, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to master data, processing results, and/or predetermined data/thresholds.

For example, the storage devices 204 can store master data that includes descriptions of objects (e.g., boxes, cases, containers, and/or products) that may be manipulated by the robotic system 100. In one or more embodiments, the master data can include a dimension, a shape (e.g., templates for potential poses and/or computer-generated models for recognizing the object in different poses), mass/weight information, a color scheme, an image, identification information (e.g., bar codes, quick response (QR) codes, logos, etc., and/or expected locations thereof), an expected mass or weight, or a combination thereof for the objects expected to be manipulated by the robotic system 100. In some embodiments, the master data can include manipulation-related information regarding the objects, such as a center-of-mass (CoM) location on each of the objects, expected sensor measurements (e.g., force, torque, pressure, and/or contact measurements) corresponding to one or more actions/maneuvers, or a combination thereof. The robotic system can look up pressure levels (e.g., vacuum levels, suction levels, etc.), gripping/pickup areas (e.g., areas or banks of vacuum grippers to be activated), and other stored master data for controlling transfer robots. The storage devices 204 can also store object tracking data. In some embodiments, the object tracking data can include a log of scanned or manipulated objects. In some embodiments, the object tracking data can include image data (e.g., a picture, point cloud, live video feed, etc.) of the objects at one or more locations (e.g., designated pickup or release locations and/or conveyor belts). In some embodiments, the object tracking data can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

In some embodiments, a controller (e.g., controller 109 of FIG. 1) can include the processors 202, storage devices 204, communication devices 206, and/or input-output devices 208. The controller can be a standalone component or part of a unit/assembly. For example, each unloading unit, a transfer assembly, a transport unit, and a loading unit of the system 100 can include one or more controllers. In some embodiments, a single controller can control multiple units or standalone components.

The robotic system 100 can include or be coupled to physical or structural members (e.g., robotic manipulator arms) connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place. For example, the actuation devices 212 and transport motors connected to or part of a robotic arm, a linear slide, or other robotic component.

The sensors 216 can be configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or for a surrounding environment. Some examples of the sensors 216 can include contact sensors, proximity sensors, accelerometers, gyroscopes, force sensors, strain gauges, torque sensors, position encoders, pressure sensors, vacuum sensors, etc.

In some embodiments, for example, the sensors 216 can include one or more imaging devices 222 (e.g., 2-dimensional and/or 3-dimensional imaging devices). configured to detect the surrounding environment. The imaging devices can include cameras (including visual and/or infrared cameras), lidar devices, radar devices, and/or other distance-measuring or detecting devices. The imaging devices 222 can generate a representation of the detected environment, such as a digital image and/or a point cloud, used for implementing machine/computer vision (e.g., for automatic inspection, robot guidance, or other robotic applications).

Referring now to FIGS. 1 and 2, the robotic system 100 (via, e.g., the processors 202) can process image data and/or the point cloud to identify the target object 112 of FIG. 1, the start location 114 of FIG. 1, the task location 116 of FIG. 1, a pose of the target object 112 of FIG. 1, or a combination thereof. The robotic system 100 can use image data to determine how to access and pick up objects. Images of the objects can be analyzed to determine a pickup plan for positioning a vacuum gripper assembly to grip targeted objects even though adjacent objects may also be proximate to the gripper assembly. Imaging output from onboard sensors 216 (e.g., lidar devices) and image data from remote devices (e.g., the imaging system 160 of FIG. 1) can be utilized alone or in combination. The robotic system 100 (e.g., via the various units) can capture and analyze an image of a designated area (e.g., inside the truck, inside the container, or a pickup location for objects on the conveyor belt) to identify the target object 112 and the start location 114 thereof. Similarly, the robotic system 100 can capture and analyze an image of another designated area (e.g., a release location for placing objects on the conveyor belt, a location for placing objects inside the container, or a location on the pallet for stacking purposes) to identify the task location 116.

Also, for example, the sensors 216 of FIG. 2 can include position sensors 224 of FIG. 2 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task. The unloading unit, transfer unit, transport unit/assembly, and the loading unit disclosed herein can include the sensors 216.

In some embodiments, the sensors 216 can include contact sensors 226 (e.g., force sensors, strain gauges, piezoresistive/piezoelectric sensors, capacitive sensors, elastoresistive sensors, and/or other tactile sensors) configured to measure a characteristic associated with a direct contact between multiple physical structures or surfaces. The contact sensors 226 can measure the characteristic that corresponds to a grip of the end-effector (e.g., the gripper) on the target object 112. Accordingly, the contact sensors 226 can output a contact measurement that represents a quantified measurement (e.g., a measured force, torque, position, etc.) corresponding to physical contact, a degree of contact or attachment between the gripper and the target object 112, or other contact characteristics. For example, the contact measurement can include one or more force, pressure, or torque readings associated with forces associated with gripping the target object 112 by the end-effector.

Target Object and Gripper Assembly

Figure 3A:
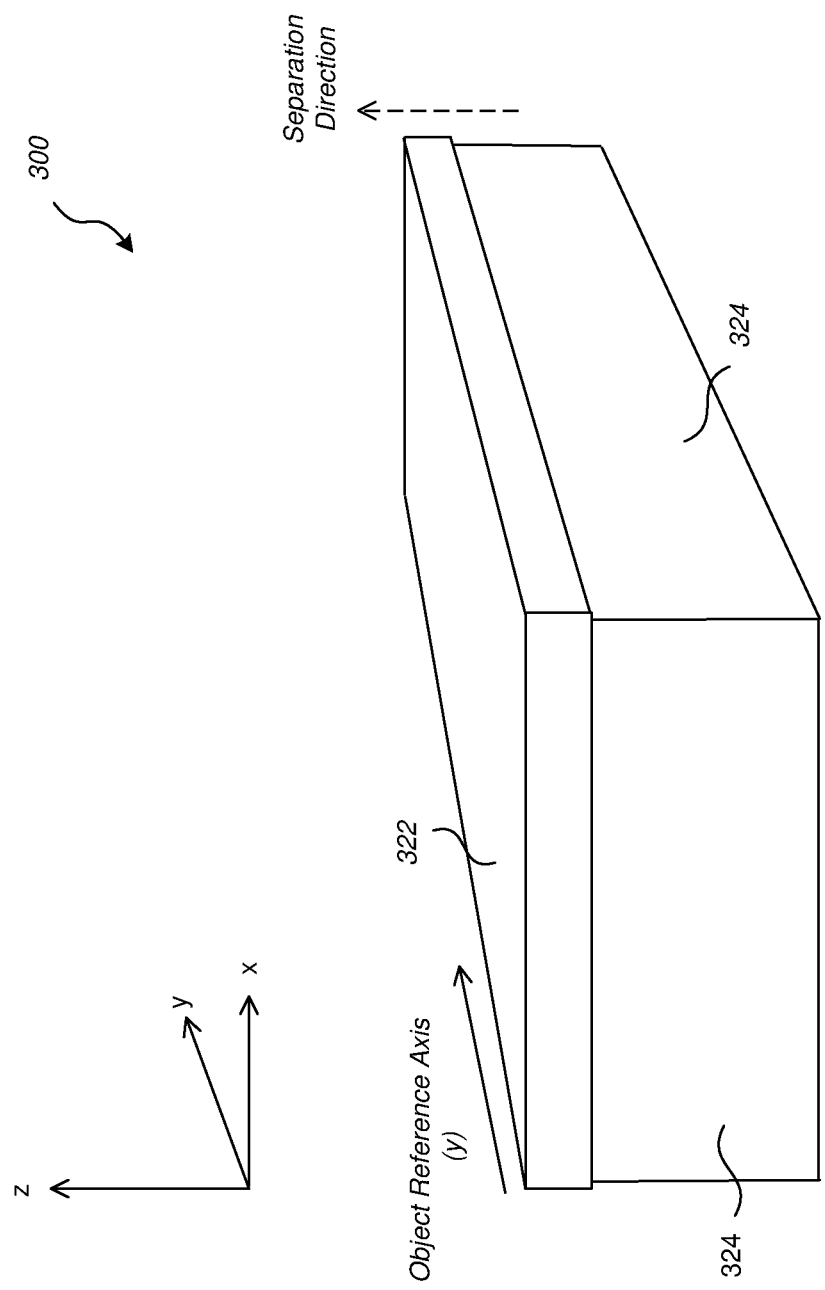
FIG. 3A is a perspective view of an example target object in accordance with one or more embodiments of the present technology.

FIG. 3A is a perspective view of an example target object 300 (e.g., an instance of the target object 112) in accordance with one or more embodiments of the present technology. The target object 300 processed by the robotic system 100 can include openable objects or packages having one or more fixed, moveable, or removable lids. For example, the target object 300, such as a shoe box, can have unfastened or friction-based covers or lids that may open based on a pose of the target object 300 and/or without direct robotic manipulation on one or more portions of the object. While the different portions of the target object 300 may be fixed or attached to each other, such as using tape, adhesives, or other external fasteners.

The target object 300 can have a reference or a body portion 324 and a lid 322 (e.g., a fixed, hinged, removable, or movable lid or flap). The reference portion 324 can support, surround, or house one or more contents (e.g., shoes) therein, and the removable portion can provide a cover. For example, the reference portion 324 can include a bottom/support surface and one or more vertical walls, while the lid 322 can include a top/cover surface and/or one or more complementary walls.

The removable portion 322 can remain unfastened or unattached to the reference portion 324. For example, the lid 322 can be a separate or independent structure that rests and covers the reference portion 324 when the target object 300 is in an upright pose as illustrated in FIG. 3A. In some embodiments, a portion or an edge the lid 322 can be connected to or integral with the reference portion 324, such as in forming a hinge for the cover. Regardless of the structural connection between the different portion, the inner sidewall surfaces may contact top portions of outer surfaces on the reference portion sidewalls when the lid 322 covers the reference portion 324. The friction between the contacting surfaces may provide some resistance to keep the removable portion 322 over the reference portion 324. However, the friction may be insufficient to keep the lid 322 attached to the reference portion 324 in other poses (e.g., sideways or 90° or 180° rotated poses where the lid 322 extends vertically or for an upside-down pose), especially when the target object 300 contains relatively heavier objects that may push against the lid 322.

An object reference axis may be used to describe directions, orientations, poses, or the like from the perspective of the object. The object reference axis may extend along a length of the object. Some shoe boxes may have the length (shown along a y-axis of an external reference system) that is greater than a width (shown along an x-axis) and a height (shown along a z-axis). The height may be defined based on a relationship between the lid 322 and the reference portion.

Figure 3B:
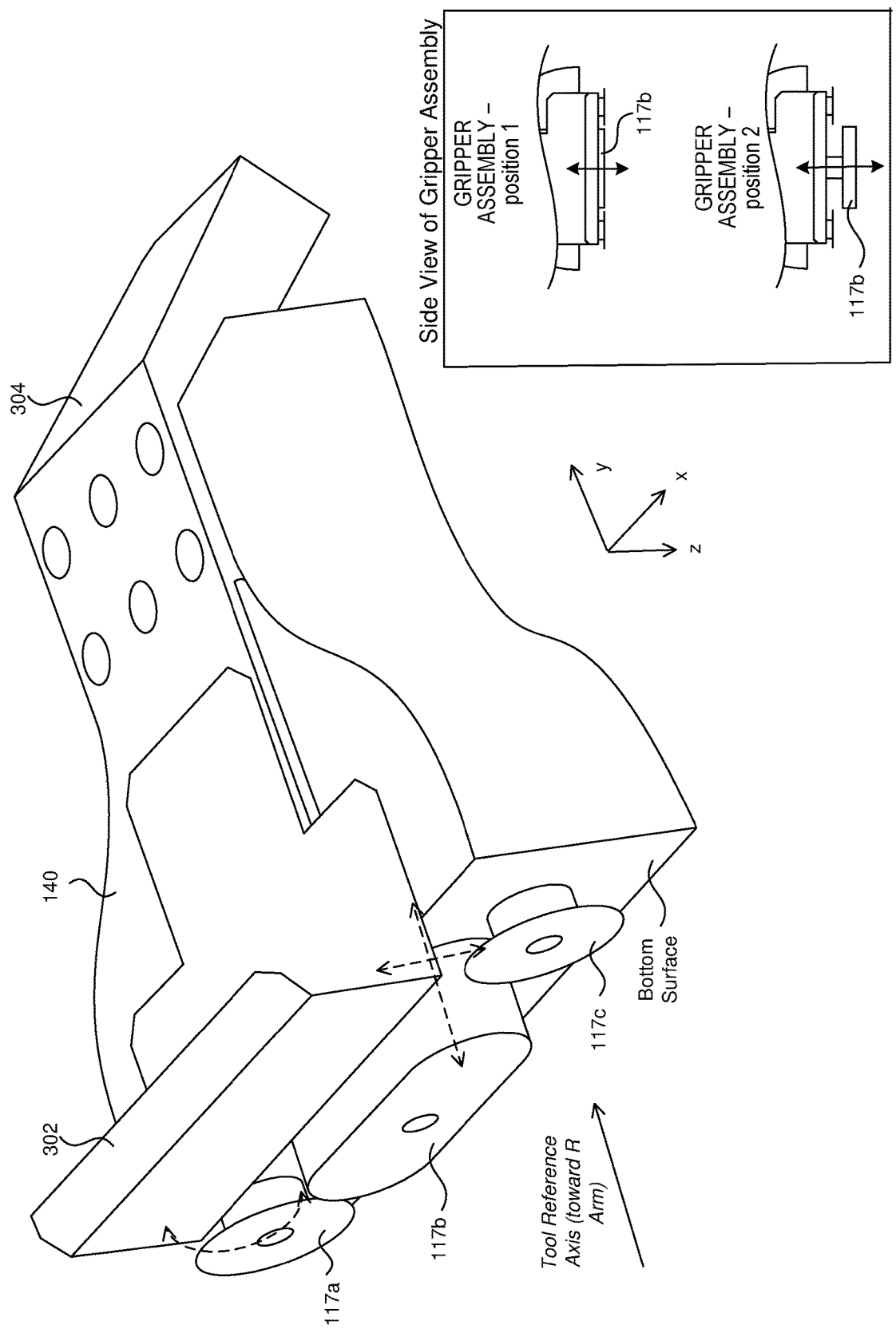
FIG. 3B is a perspective view of an end effector, in accordance with one or more embodiments of the present technology.

The robotic system can include and/or operate an end-effector configured to manipulate the target object (e.g., shoe box). FIG. 3B is a perspective view of an end effector (e.g., the end effector 140) in accordance with some embodiments of the present technology. The end effector 140 can be coupled/attached to a distal end of a robotic arm assembly. The robotic arm gripper assembly can position the end effector 140 at or near one or more objects located at a pickup environment. The end-effector 140 may be generally oriented and referenced with its distal end portions (e.g., the bottom surface) generally facing downward (e.g., generally along the real-world z-axis), such as for gripping top surfaces of objects. However, for comparison purposes, the reference axes in FIG. 3B corresponds to the reference axes in FIG. 3A. Details regarding the manipulation of the end effector 140 and the target object is discussed below. A tool reference axis/direction used to reference spatial relationships relative to the end effector may extend along a direction from the distal end/bottom surface toward the robotic arm assembly attachment point.

Target objects can be secured against the bottom of the end effector 140. In some embodiments, the gripper assembly can have addressable regions each selectively capable of drawing in air for providing a vacuum grip. In some modes of operation, only addressable regions proximate to the targeted object(s) draw in air to provide a pressure differential directly between the vacuum gripper device and the targeted object(s). This allows only selected packages (e.g., targeted packages) to be pulled or otherwise secured against the gripper assembly even though other gripping portions of the gripper assembly 140 are adjacent to or contact other packages.

The end effector 140 can include addressable vacuum zones or regions 117a, 117b, 117c (collectively "vacuum regions 117") defining a gripping zone. The description of one vacuum region 117 applies to the other vacuum regions 117 unless indicated otherwise. In some embodiments, each vacuum region 117 can be a suction channel bank that includes components connected to a vacuum source external to the end effector 140. The vacuum regions 117 can include gripping interfaces (e.g., one or more suction cups) against which objects can be held.

The vacuum regions 117 can draw in air to hold the package 112 and can reduce or stop drawing in air to release the package 112. The vacuum regions 117 can independently draw in air to hold packages at various positions. The vacuum regions 117 can include a group or bank of suction elements through which air is drawn. The suction elements can be evenly/uniformly or unevenly spaced apart from one another and can be arranged in a desired pattern (e.g., an irregular or regular pattern). The vacuum regions 117 can have the same or different number, configurations, and/or pattern of suction elements. To carry a package that matches the geometry of the vacuum region 117, air can be drawn through each suction element of the vacuum region 117 (e.g., 117a, 117b, and 117c). To carry smaller packages, air can be drawn through a subset of the vacuum regions 117 (e.g., 117b, 117a and 117b, 117b and 117c), or matching the geometry of the package.

When all of the vacuum regions 117 are active, the end effector 140 can provide a generally uniform gripping force to a target object. The end effector 140 can be configured to hold or affix object(s) via attractive forces, such as achieved by forming and maintaining a vacuum condition between the vacuum regions 117 and the object. For example, the end effector 140 can include one or more vacuum regions 117 configured to contact a surface of the target object and form/retain the vacuum condition in the spaces between the vacuum regions 117 and the surface. The vacuum condition can be created when the end effector 140 is lowered via the robotic arm, thereby pressing the vacuum regions 117 against the surface of the target object and pushing out or otherwise removing gases between the opposing surfaces. When the robotic arm lifts the end effector 140, a difference in pressure between the spaces inside the vacuum regions 117 and the surrounding environment can keep the target object attached to the vacuum regions 117. In some embodiments, the air-flow rate through the vacuum regions 117 of the end effector 140 can be dynamically adjusted or based on the contact area between the target object and a contact or gripping surface of the vacuum regions 117 to ensure that a sufficient grip is achieved to securely grip the target object. Similarly, the air-flow rate thought the vacuum regions 117 can be adjusted dynamically to accommodate the weight of the target object, such as increasing the air flow for heavier objects, to ensure that sufficient grip is achieved to securely grip the target object.

The vacuum regions 117a, 117b, and 117c can move independently of each other, such as by retracting closer or extending away relative to the bottom surface of the gripper assembly 140. Accordingly, the vacuum regions 117a, 117b, and 117c may contact objects at different locations and/or times. For example, (as illustrated in the side view for the gripper assembly position 2) the suction cup(s) for the center vacuum region 117b may extend away from the bottom surface to engage the target object before other regions. After gripping the target object, the suction cup(s) for the center vacuum region 117b may be retracted (as illustrated in gripper assembly position 1) until the object contacts/engages the suction cups of the peripheral vacuum regions 117a and 117c. The peripheral vacuum regions can be engaged to grip the target object once the center region retracts. In other words, the center portion can be used to move/displace the target object a relatively small distance (e.g., away from other or adjacent objects), and the peripheral portions can be used to provide additional grasping forces once the target object is moved away from other non-targeted objects. Accordingly, the gripper assembly 140 can reduce unintended double picks (e.g., picking up an unintended/additional object along with the target object). The peripheral vacuum regions can be used to provide sufficient grip to manipulate/transfer the target object.

The end effector 140 may include a stabilizer bracket 302 configured to further assist in manipulation/transfer of the target object, the stabilizer bracket 302 can include a support surface that extends parallel to the tool reference axis and an alignment of the suction cups. The support surface can be configured to contact a non-engaged portion of the target object (e.g., a peripheral surface orthogonal to the gripped surface). In some embodiments, the end effector 140 may be configured to extend and/or retract the stabilizer bracket 302 along one or more directions. For example, the end effector 140 can have the bracket 302 retracted at a rest position closest to the bottom surface and/or away from the body of the end effector 140 (e.g., moved along the −z direction). The rest position can be established before engaging the target object and/or maintained up to the initial displacement of the target object using the center vacuum region 117b. The gripper assembly 140 can move the bracket 302 below or past the bottom surface (e.g., away from the robotic arm assembly) and/or toward the body of the end effector 140 (e.g., along the −z direction) until the support surface contacts the grasped object. The end effector 140 may include an angled attachment arm 304. The angle of the angled attachment arm 304 may be such that the position of the end effector 140 attached to the robotic arm is angled to keep the cover or lid of the target object closed during transfer.

Gripping/Lifting Configurations

Figure 4A:
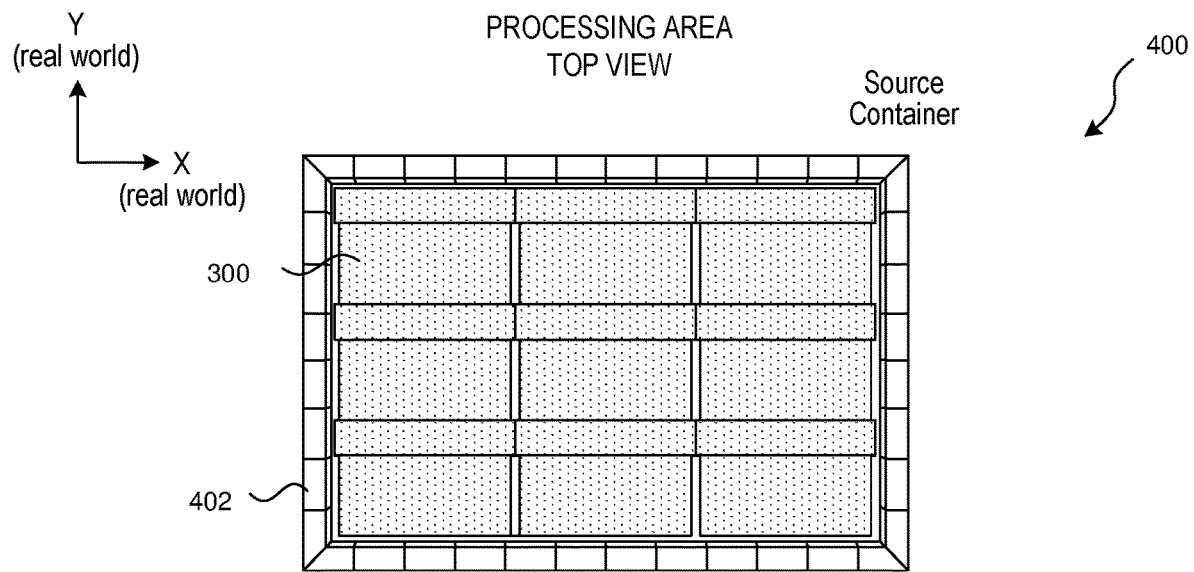
FIG. 4A illustrates a top view of the processing area for lifting target objects from a source container, in accordance with one or more embodiments of the present technology.
Figure 4B:
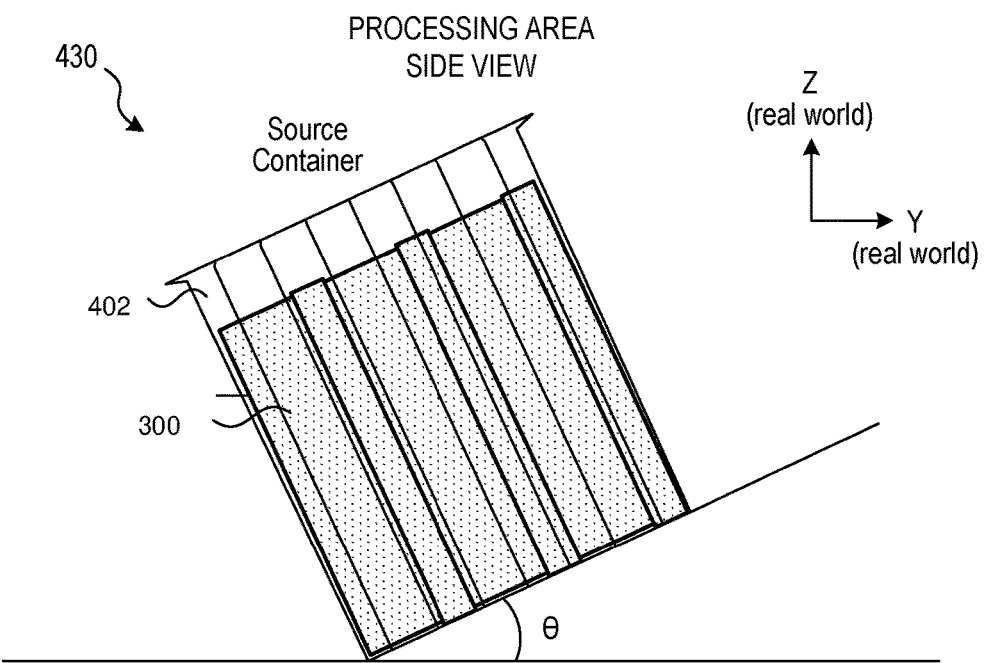
FIG. 4B illustrates a side view of the processing area for lifting target objects from a source container, in accordance with one or more embodiments of the present technology.

The robotic system can grip and lift the target objects from a source container. After lifting, the robotic unit (e.g., the transfer robot or the robotic arm assembly having the end effector at a distal end) can transfer the target object to a target location (e.g., a destination). In some embodiments, the destination can correspond to a location on a conveyor. FIG. 4A illustrates a top view 400 (e.g., image data 223 received from an overhead instance of the imaging device 222 of FIG. 2) of the processing area for lifting target objects (e.g., the target object 300) from a source container 402, in accordance with one or more embodiments of the present technology. For example, the top view 400 shows the target objects (e.g., shoe boxes) placed in or removed from a container (e.g., a bin). FIG. 4B illustrates a side view 430 (e.g., image data 223 received from a laterally-oriented instance of the imaging device 222) of the processing area for lifting target objects from a source container, in accordance with one or more embodiments of the present technology. The container 402 and/or the objects (e.g., target object 300) therein can be placed at an angle such that the bottom surface of the source container and/or each object form acute angles (e.g., angle $\theta$ with corresponding horizontal reference plane. The angular placement pose can allow the lids of the objects to stay at rest above the reference portions while allowing the end effector to approach the objects from above (by, e.g., at least partially move downward to contact and grip the object).

Figure 4C:
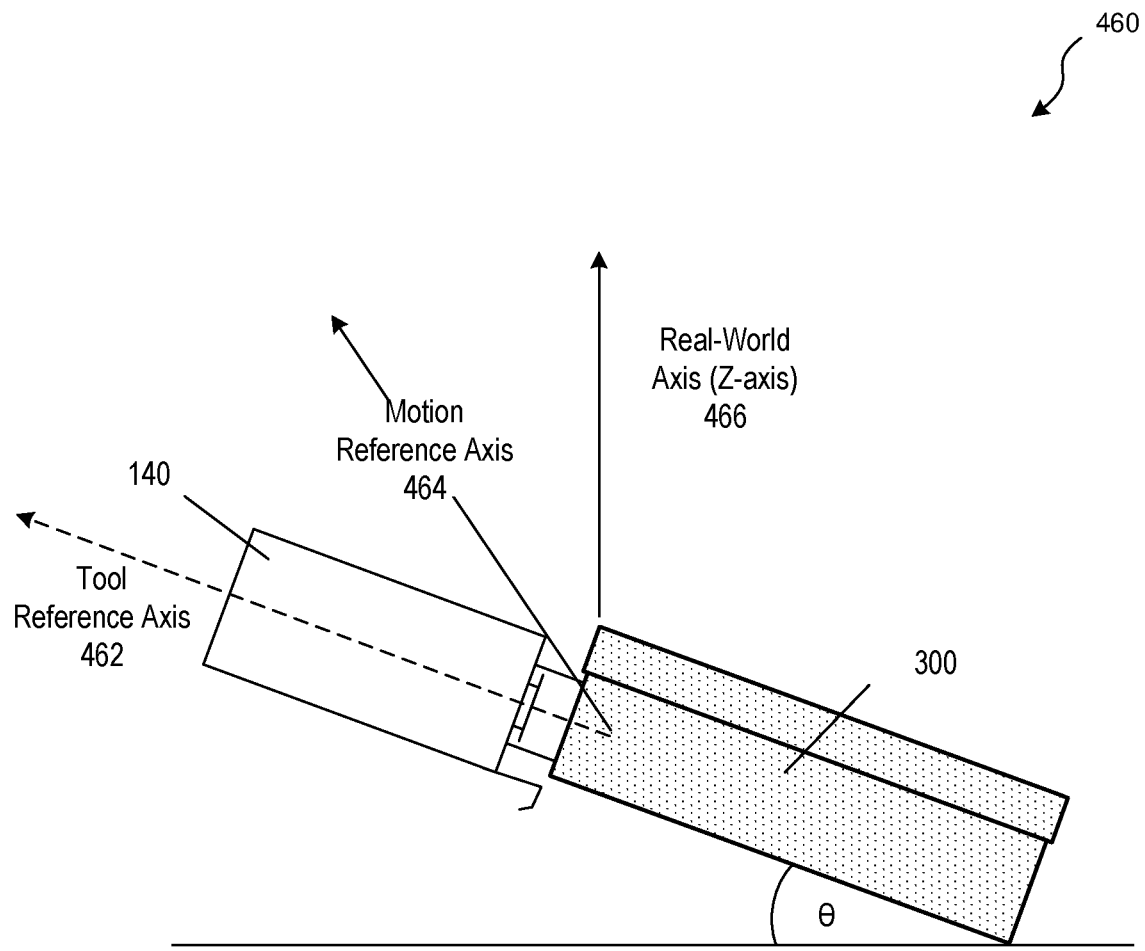
FIG. 4C illustrates a side view a robotic arm assembly gripping and lifting the target object in an example grip/lift configuration, in accordance with one or more embodiments of the present technology.

FIG. 4C illustrates a side view 460 a robotic arm assembly gripping and lifting the target object in an example grip/lift configuration, in accordance with one or more embodiments of the present technology. The gripper assembly can approach the target object in an angled pose that corresponds to the angled resting pose of the objects. For example, the end effector 140 can be positioned with the tool reference axis 462 forming an angle relative to the floor for matching that of the angled resting pose (e.g., angle $\theta$) to grip/lift a target object 300. The robotic system can derive and implement motion plans to move the end effector along the angled direction (e.g., downward and toward the object) to contact and grip the target object. As described above, the robotic system can extend the suction cup(s) (e.g., vacuum region 117b of FIG. 3B) in the center portion from position 1 to position 2 to grip the target object. After gripping the target object, the center suction cup(s) can be retracted. Accordingly, the gripped object can be displaced a relatively short distance along the tool reference axis. Once the target object is moved away from the adjacent objects, the peripheral suction cups can be engaged to further grip the target object.

In some embodiments, the robotic system can move the suction cups and/or the support bracket as the target object is moved out of the source container. For example, the bracket can be extended away from the bottom surface and/or toward the target object until the support surface of the bracket contacts the target object (e.g., bottom surface thereof).

The bracket can be configured to provide support for a motion reference axis (e.g., motion reference axis 464). The motion reference axis can represent a pose and/or a general movement direction for the end effector for or during the transfer of the target object. The robotic system can determine the motion reference axis that is tilted or angled away from the real-world z-axis (e.g., real-world z-axis 466). In comparison, conventional systems and/or transfer configurations orient the tool reference axis parallel to the z-axis. The conventional gripping interface face a downward direction and the target object is grasped/held below the end-effector. However, such conventional transfer poses can be problematic for objects with fixed/hinged/moveable/removable lids. The gravitational forces in a general up and down transfer pose can cause the separate portions to disengage or move away from each other. Moreover, contents within the target object may shift and further cause the separate portions to move away from each other. To prevent the different portions of the object from moving away from each other, embodiments of the robotic system can determine and leverage the angled motion reference axis such that the target object is maintained at an angle with the lid above the reference portion during the transfer.

In some embodiments, the robotic system can determine the angled motion reference axis based on a predetermined displacement angle relative to the z-axis. In other embodiments, the robotic system can derive the displacement angle based on the grip location (e.g., interface footprint on the object), the weight of the object, the dimensions of the object (e.g., the length), the size and/or contact location(s) of the bracket on the object, rotational forces or torque measured by the end effector after gripping/lifting the object, and/or other physical traits of the end effector and/or the target object. In some embodiments, the displacement angle can be outside of tilt control boundaries of conventional configurations/devices.

Figure 5:
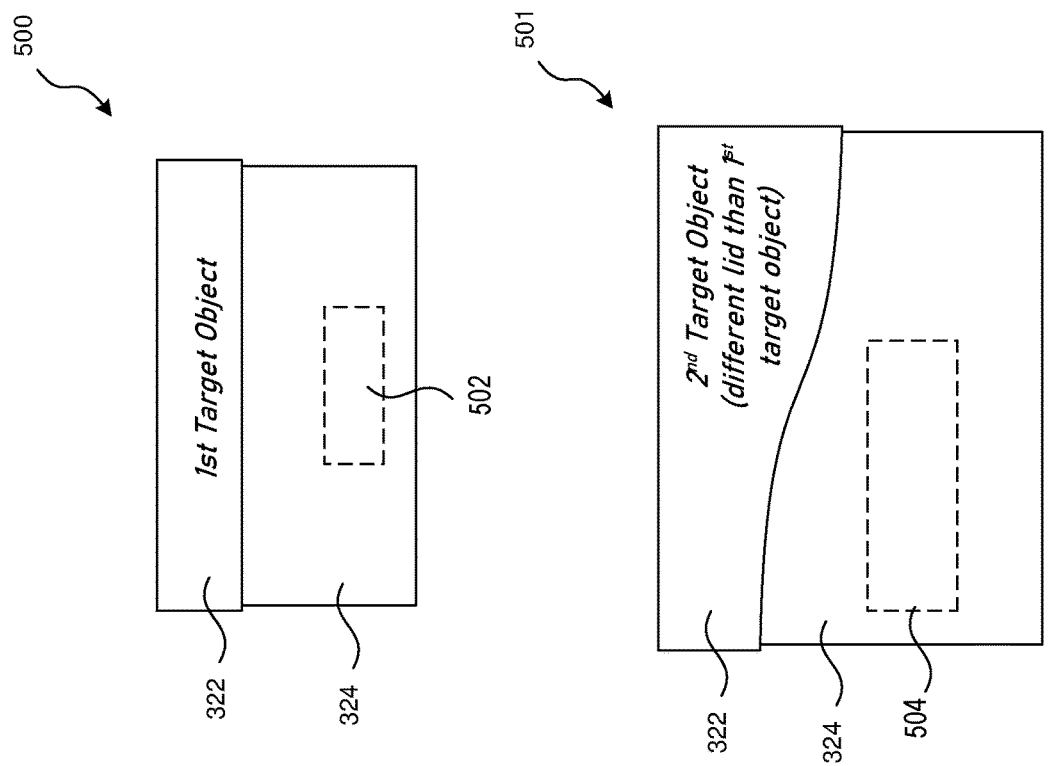
FIG. 5 illustrates side view of example target objects with a grip location with respect to contact between the gripper and the target object(s), in accordance with one or more embodiments of the present technology.

FIG. 5 illustrates side view of example target objects (e.g., target objects 500 and 501) with a grip location (e.g., grip location 502 and 504) with respect to contact between the gripper and the target object(s), in accordance with one or more embodiments of the present technology. The robotic system can be configured to grip the reference portion 324 of the object. In determining the grip location 502, the robotic system can place a mask over the lid 322 (e.g., cover) in the received image (e.g., the top view 400) of the target object. Accordingly, the robotic system can consider/process only the reference portion.

In some embodiments, the robotic system can determine the grip location 502 below (e.g., away from the separation direction) the center of mass location or an estimate thereof to minimize torque applied on the grip interface. Additionally or alternatively, the robotic system can determine the grip location at a distance away from the bottom surface of the object, where the distance matches a separation distance between the suction cups and the contact surface of the bracket. In other embodiments, the robotic system can be configured to determine the grip location closest to the lid. In a first example, target object 500 has a grip location 502 at, above, or below the center of mass of the target object 500. In a second example, target object 501 has a grip location offset (e.g., side of) from the center of mass of the target object 501. In some embodiments, the robotic system determines the grip location based on the shape of the lid of the target object. For example, the grip location on the target objects 500 and 501 are different due to the different lids/covers of target objects 500 and 501.

Figure 6:
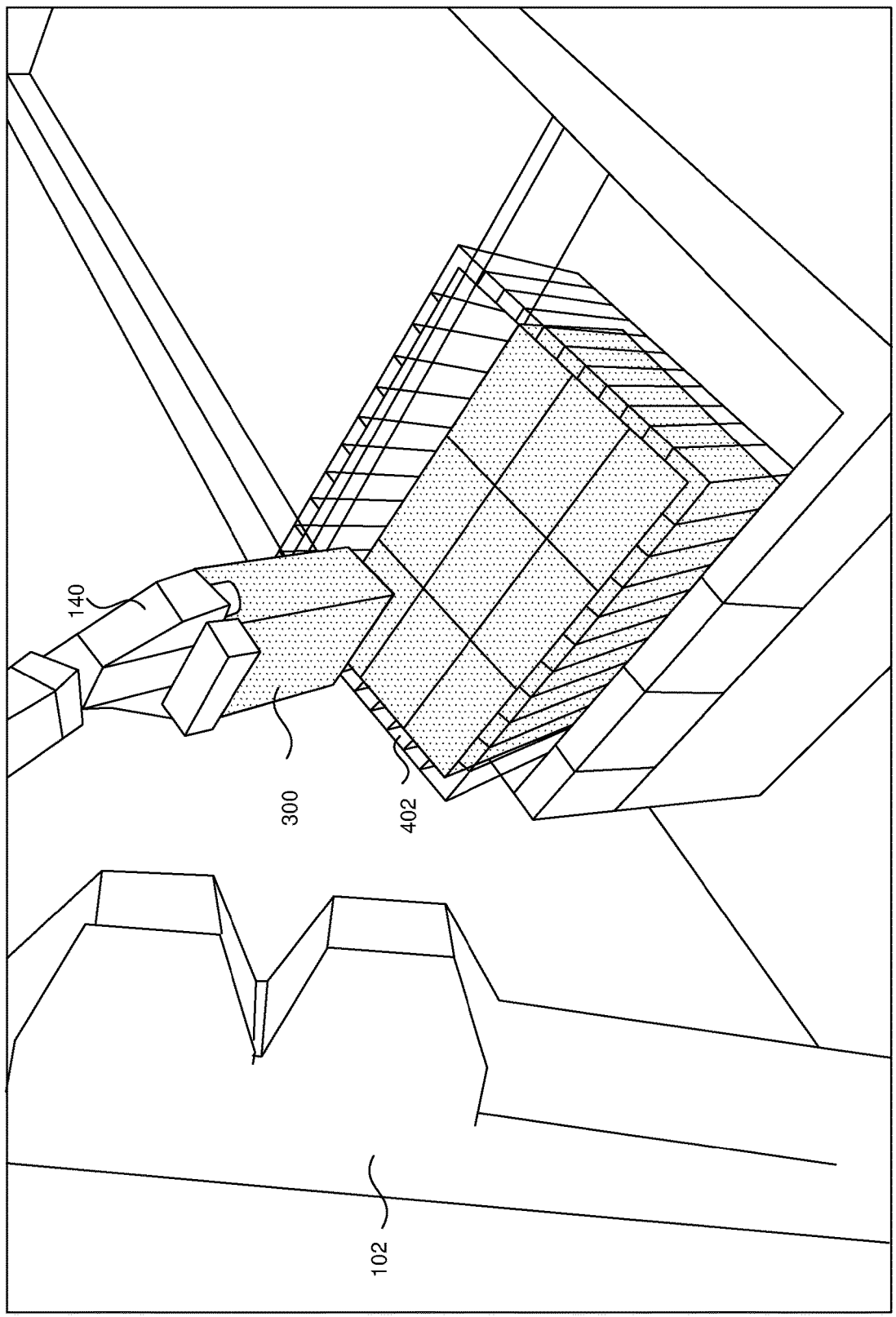
FIG. 6 illustrates a perspective view of the robotic arm assembly gripping and lifting the target object in an example grip/lift configuration, in accordance with one or more embodiments of the present technology.

FIG. 6 illustrates a perspective view of the robotic arm assembly gripping and lifting the target object in an example grip/lift configuration, in accordance with one or more embodiments of the present technology. The robotic system 100 of FIG. 1 can grip and lift the target objects 300 from the source container 402. After lifting, the robotic unit (e.g., the transfer robot or the robotic arm assembly having the end effector 140 at a distal end) can transfer the target object 300 to the target location 116 (e.g., a destination). In some embodiments, the destination can correspond to a location on a conveyor, another bin, a pallet, or the like.

Operational Flow

Figure 7:
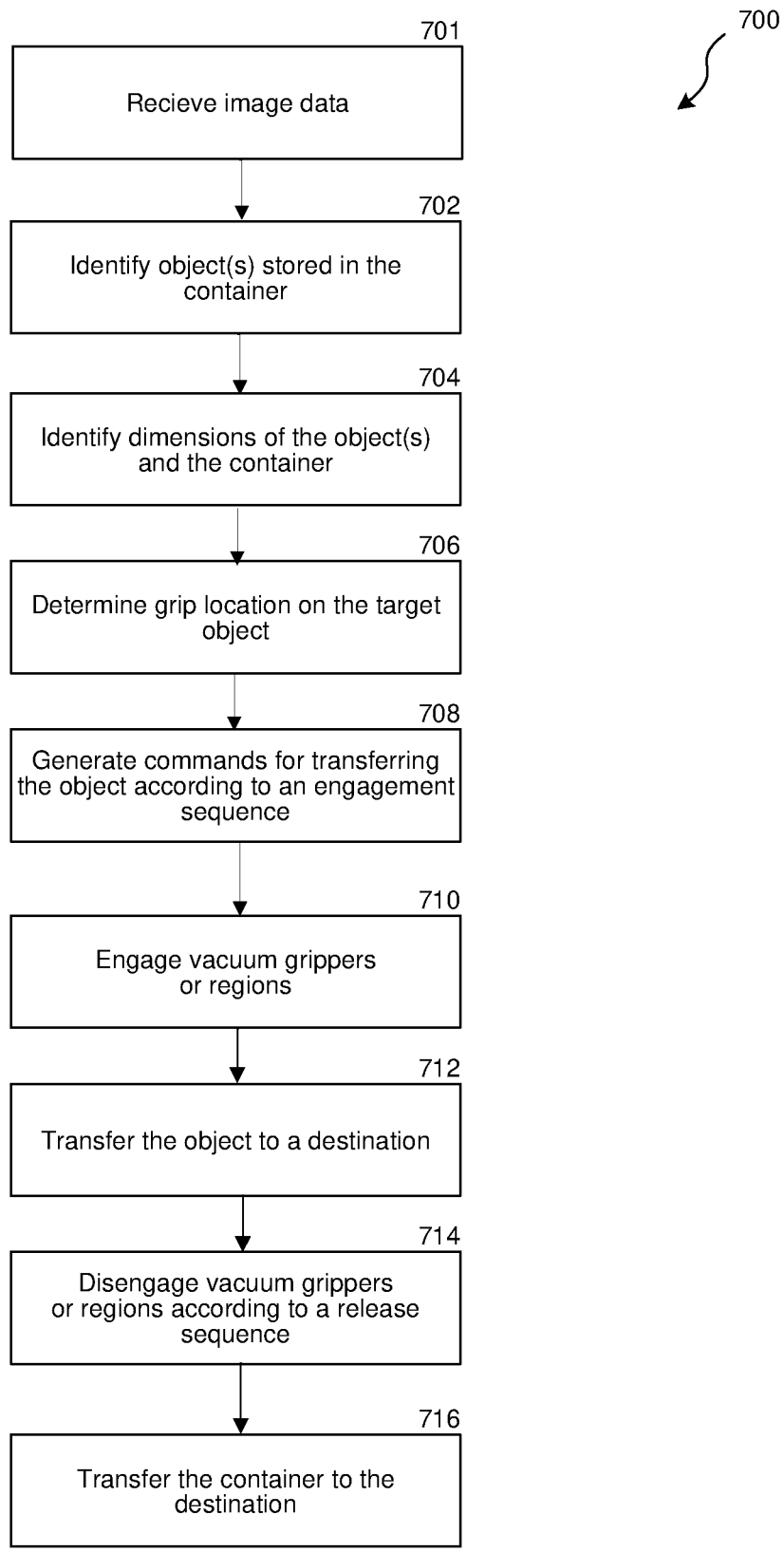
FIG. 7 is a flow diagram for operating a robotic system in accordance with one or more embodiments of the present technology.

FIG. 7 is a flow diagram of a method 700 for operating a robotic system (e.g., the robotic system 100 of FIG. 1 or a portion thereof) in accordance with one or more embodiments of the present disclosure. In general, the robotic system (via, e.g., the controller of FIG. 1, the communication device 206 of FIG. 2 and/or the image device 222 of FIG. 2) can receive image data (e.g., the top view 300 of FIG. 3) representative of at least a portion of a pickup environment as illustrated at block 701. The robot system can identify target objects (e.g., the target objects 300 of FIG. 3A) based on the received image data.

The robotic system can receive the image data representative of at least a portion of an environment. For example, the received image data can depict objects in a container. The image data can include, without limitation, video, still images, lidar data, radar data, object identification data, bar code data, or combinations thereof. In some embodiments, for example, the sensors can capture video or still images that are transmitted (e.g., via a wired or wireless connection) to a computer or controller, such as the controller 109.

At block 702, the robotic system or a portion thereof (e.g., the controller 109, the processor 202, etc.) can analyze image data to identify target objects in a group of objects, a container of objects, a stack of objects, etc. For example, the controller can identify individual objects based on the received image data. The controller can identify visual markers/designs and/or identifying information (e.g., bar codes, quick response (QR) codes, logos, etc., and/or expected locations thereof) on the container or objects. The identifying information and the visual markers can indicate other characteristics of the object, such as the dimensions and weight of the objects as registered in the master data. The robotic system can further determine, such as using the master data or a shipping manifest, that the identified target object has one or more fixed, hinged, moveable, or removable lids or flaps, such as for a shoebox having unfastened or partially connected covers/lids that may open based on a pose of the object and/or without direct robotic manipulation on the lid.

In some embodiments, information from the release location is used to select the target object. For example, the robotic system can select a target object based on the packing order, the object location within the container, the amount of available space at the release location, the preferred stacking arrangement, etc. A user can input selection criteria for determining the order of object pick up. In some embodiments, a mapping of the pickup environment can be generated based on the received image data. In some mapping protocols, edge detection algorithms are used to identify edges of objects, surfaces, etc. The robotic system can analyze the mapping to determine which objects at the pickup region are capable of being transported together.

The robotic system can select the target object from source objects as the target of a task to be performed. For example, the robotic system can select the target object to be picked up according to a predetermined sequence, set of rules, templates of object outlines, or a combination thereof. As a specific example, the robotic system can select the target package as an instance of the source packages that are accessible to the end effector (e.g., end effector 140), such as an instances of the source packages located in a container (e.g., source container 402) of packages, according to the point cloud/depth map representing the distances and positions relative to a known location of the image devices. In an example, the robotic system can select the target object according to a predetermined pattern, such as left to right or nearest to furthest relative to a reference location, without or minimally disturbing or displacing other instances of the source packages.

At block 704, the controller (e.g., controller 109 of FIG. 1) can identify dimensions of the target objects and the dimension of the container. The controller can identify the dimensions of the target objects and the dimension of the container by scanning/reading an object identifier (e.g., bar code, QR code, etc.) on the target objects and/or container. Based on the dimensions of the target object (e.g., the location/orientation of the fixed, hinged, moveable, or removable lids or flaps of the object), the controller can determine whether the center vacuum region 117*b* and/or peripheral vacuum regions 117*a/c* can fit within the reference portion 324 and/or an operating sequence of the vacuum regions to use to lift and transfer the object.

At block 706, the controller can determine the grip locations of the vacuum grippers or regions for gripping the target object. For example, the controller 109 can select the vacuum region 117*b* for gripping the package 112 because the entire package 112 (e.g., target object) can be supported by the vacuum region 117*b*. A vacuum to be drawn through substantially all of the suction elements (e.g., at least 90%, 95%, 98% of the suction elements) of the vacuum region 117*b* of FIG. 3B. The controller 109 can select the engagement sequence of vacuum grips based on the dimensions of the target object. In an example, the grip location (e.g., the grip location 502 or 504 of FIG. 5) is located on the reference portion 324 of the target object without contacting or overlapping the moveable portion 322 (e.g., lid). The controller 109 can determine the grip locations based on the center of mass (COM) location (e.g., below the COM to adjust torque experienced by the gripper) and/or the boundary between the different portions of the objects (e.g., as closest to the lid and/or as high as possible on the reference portion).

At block 708, the controller can generate or derive one or more commands for controlling the robotic system (e.g., the robotic unit, such as the robotic arm assembly) and transferring objects. In some modes of operation, the commands can correspond to the motion plan. For example, the controller can generate one or more commands for positioning the gripper, extend one or more sections of suction cup(s), and/or cause a vacuum source to provide a vacuum at a selected vacuum level, thereby grasping the target object 300. The vacuum level can be selected based on the weight or mass of the target object(s), tasks to be performed, etc. Commands can be sent to the gripper assembly to cause a manifold to operate to provide suction at the selected regions or grippers. The controller generates a command to cause actuation devices (e.g., actuation devices 212), motors, servos, actuators, and other components of the robotic arm to move the gripper assembly. The robotic system can generate transfer commands to cause the robotic transport arm to robotically move the gripper assembly carrying the objects between locations. The robotic system can generate the transport commands based on a motion plan that corresponds to a transport path to deliver the object to a release location without causing the object to strike another object.

The generated commands can be for operating and/or controlling the robot arm and/or the gripper to approach the target object in an angled pose that corresponds to the angled resting pose of the objects. In other words, the gripper can be positioned with the tool reference axis forming an angle matching that of the angled resting pose of the target object. The robotic system can derive and implement motion plans to move the end effector along the angled direction (e.g., downward and toward the object) to contact and grip the target object. As described above, the robotic system can extend the suction cup(s) (e.g., vacuum region 117*b* of FIG. 3B) in the center portion from position 1 to position 2 to grip the target object. After gripping the target object, the center suction cup(s) can be retracted. Accordingly, the gripped object can be displaced a relatively short distance along the tool reference axis and closer to the bottom/gripping interface of the end effector. Once the target object is moved away from the adjacent objects, the peripheral suction cups can be engaged to further grip the target object. In some embodiments, the robotic system can move the suction cups and/or the support bracket as the target object is moved out of the source container. For example, the bracket can be extended away from the bottom surface and/or toward the target object until the support surface of the bracket contacts the target object (e.g., bottom surface thereof).

The bracket can be configured to provide support for a motion reference axis. The motion reference axis can represent a pose and/or a general movement direction for the end effector for or during the transfer of the target object. The robotic system can determine the motion reference axis that is tilted or angled away from the real-world z-axis. The robotic system can determine and use the angled motion reference axis such that the target object is maintained at an angle with the lid above the reference portion during the transfer.

At block 710, the controller can engage the vacuum grippers to transfer the target object, such as by implementing a corresponding portion of the motion plan/commands. The end effector can be configured to grip the target package or object from among the source packages or objects. For example, the robotic system 100 can generate instructions for the end effector 140 to engage multiple instances of the vacuum regions 117 to perform the gripping operation to simultaneously grip multiple grip locations of the target object and withdraw the object from a container. As a specific example, the end effector 140 can be used to perform instructions for the gripping operation of gripping the target object and in sequence, one after the other.

At block 712, the robotic system 100 can transfer the target object to a destination or target location, such as by implementing a subsequent portion of the motion plan/commands after grasping the target object. The robotic system can transfer the target object with an angled carry (according to the angled motion reference axis discussed above) to prevent the fixed, hinged, moveable, or removable lid of the target object from opening during the transfer.

At block 714, the controller can disengage the vacuum grippers, according to a release sequence of the motion plan/commands, to release the target object at the target location (e.g., conveyor belt). At block 716, the robotic system can transfer the container to a target location, similar to transferring the target object to the location. For example, when the objects are removed from the container and the container is empty, the robotic system transfers the container to the target location.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A robotic system comprising;
    a controller configured to:
        determine, based on dimensions of a target object having one or more lids, a grip location on the target object for engagement by a robotic gripper assembly, wherein the robotic gripper assembly includes:
            a first gripper portion configured to grasp the target object at the grip location, and
            a second gripper portion adjacent to the first gripper portion,
            wherein:
                the first gripper portion is individually extendable, relative to the second gripper portion, to initially grasp the target object and retract with the target object, and
                the second gripper portion is configured to grasp the target object after initial grasp and retraction of the first gripper portion;
        determine a reference axis for aligning the robotic gripper assembly with the target object for engaging the first and/or the second gripper portions of the robotic gripper assembly;
        derive a motion plan for operating the robotic gripper assembly to:
            align the robotic gripper assembly with the target object based on the reference axis;
            contact the target object at the grip location with the first and/or the second gripper portions;
            provide a gripping force through the first and/or the second gripper portions to grip the target object at the grip location; and
            transfer the target object to a target location according to the reference axis to maintain an angled pose of the target object that maintains the one or more lids of the target object stable relative to a reference portion of the target object.

2. The robotic system of claim 1, wherein the controller is further configured to derive the motion plan for operating the robotic gripper assembly to:
    transfer the target object to the target location without opening the one or more lids of the target object.

3. The robotic system of claim 1, wherein the controller is further configured to:
    receive image data representative of at least a portion of a pickup environment;
    identify one or more target objects in a container in the pickup environment; and
    identify dimensions of the one or more target objects and the container.

4. The robotic system of claim 1, wherein the controller is configured to derive the motion plan for further operating the robotic gripper assembly to:
    derive a release pose for releasing the target object at the target location; and
    disengage the gripping force of the first and/or the second gripper portions of the robotic gripper assembly according to the release pose.

5. The robotic system of claim 1, wherein the controller is further configured to derive the motion plan based on:
    deriving, based on the dimensions, an engagement sequence of attaching the first and/or the second gripper portions of the robotic gripper assembly to the target object.

6. The robotic system of claim 1, wherein the robotic system is further configured to:
    derive a set of commands corresponding to the motion plan for operating the robotic gripper assembly to transfer the target object from a start location to the target location.

7. The robotic system of claim 1, wherein the robotic gripper assembly further includes a stabilizer bracket that is configured to contact and support the grasped target object.

8. A robotic system comprising:
a robotic arm;
an end effector kinetically coupled to the robotic arm, the end effector including:
- a first gripper portion at a bottom portion of the end effector and configured to grasp a surface of a target object;
- a second gripper portion at the bottom portion and configured to grasp the surface of the target object, wherein the second gripper portion is operable independently from the first gripper portion;
- a stabilizer bracket adjacent to the first gripper portion and the second gripper portion and extending along a direction extending from a top portion of the end effector to the bottom portion, the stabilizer bracket configured to contact the target object that has been grasped by at least the first gripper portion and provide a support force on the grasped target object;

one or more processors operably coupled to the robotic arm and the end effector, and
one or more memories storing instructions that, when executed by the one or more processors, cause the robotic system to perform a process including:
- determining, based on dimensions of the target object having one or more lids, a grip location on the target object for engagement by at least the first gripper portion to the target object;
- determining a reference axis for aligning the end effector with the target object for engaging the first and/or the second gripper portions of the end effector;
- aligning the end effector with the target object based on the reference axis;
- contacting the target object at the grip location with at least the first gripper portion;
- providing a gripping force through the first and/or the second gripper portions of the end effector to grip the target object; and
- transferring the target object to a target location according to the reference axis to maintain an angled pose of the target object that maintains the one or more lids of the target object stable relative to a reference portion of the target object.

9. The robotic system according to claim 8, wherein the process further comprises:
receiving image data representative of at least a portion of a pickup environment;
identifying one or more target objects in a container in the pickup environment; and
identifying dimensions of the one or more target objects and the container, wherein the grip location is determined within the reference portion based on the dimensions, a location of the one or more lids relative to the reference portion, a center of mass location for the target object, or a combination thereof.

10. The robotic system according to claim 8, wherein the process further comprises:
deriving a release pose for releasing the target object at the target location; and
disengaging the gripping force of the first and/or the second gripper portions of the end effector according to the release pose.

11. The robotic system according to claim 8, wherein the process further comprises:
deriving, based on the dimensions, an engagement sequence of attaching the first and/or the second gripper portions of the end effector to the target object, wherein the engagement sequence includes:
extending the first gripper portion toward the target object;
gripping the target object using the first gripper portion;
retracting the first gripper portion along with the grasped target object; and
engaging the second gripper portion to further grip the target object after retracting the first gripper portion.

12. The robotic system according to claim 8, wherein the process further comprises:
adjusting a pose of the stabilizer bracket to contact and support the grasped target object after engaging the second gripper portion.

13. A method of operating a robotic system, the method comprising:
determining, based on dimensions of a target object having one or more lids, a grip location on the target object for engagement by at least a first gripper portion of an end effector to the target object;
determining a reference axis for aligning the end effector with the target object for engaging one or more grippers of the end effector;
aligning the end effector with the target object based on the reference axis;
contacting the target object at the grip location with at least the first gripper portion;
providing a gripping force through the first gripper portion and/or a second gripper portion of the end effector to grip the target object; and
transferring the target object to a target location according to the reference axis to maintain an angled pose of the target object that maintains the one or more lids of the target object stable relative to a reference portion of the target object.

14. The method of claim 13, further comprising:
receiving image data representative of at least a portion of a pickup environment;
identifying one or more target objects in a container in the pickup environment; and
identifying dimensions of the one or more target objects and the container, wherein the grip location is determined within the reference portion based on the dimensions, a location of the one or more lids relative to the reference portion, a center of mass location for the target object, or a combination thereof.

15. The method of claim 13, further comprising:
deriving a release pose for releasing the target object at the target location; and
disengaging the gripping force of the one or more grippers of the end effector according to the release pose.

16. The method of claim 13, further comprising:
deriving, based on the dimensions, an engagement sequence of attaching the one or more grippers of the end effector to the target object, wherein the engagement sequence includes:
extending the first gripper portion toward the target object;
gripping the target object using the first gripper portion;
retracting the first gripper portion along with the target object; and
engaging the second gripper portion to further grip the target object after retracting the first gripper portion.

17. The method of claim 13, further comprising:
adjusting a pose of a stabilizer bracket of the end effector to contact and support the target object after engaging the second gripper portion, wherein the stabilizer bracket attached to the end effector provides support to the gripping force of the one or more grippers.

18. The method of claim 13 further comprising:
adjusting a pose of a stabilizer bracket of the end effector to contact and support the target object after engaging the second gripper portion, wherein the stabilizer bracket is adjacent to the one or more grippers and extends along a direction extending from a top portion of the end effector to a bottom portion of the end effector.

* * * * *